(12) United States Patent
Wise (10) Patent No.: US 12,443,056 B2
(45) Date of Patent: Oct. 14, 2025

(54) EYEWEAR WITH CIRCUMAMBIENT ILLUMINATION

(71) Applicant: CIE TECHNOLOGIES LLC, Pasadena, CA (US)

(72) Inventor: Matthew A Wise, Pasadena, CA (US)

(73) Assignee: LUMINYX LLC, Nashville, TN (US)

( * ) Notice: Subject to any disclaimer, the term of this patent is extended or adjusted under 35 U.S.C. 154(b) by 0 days.

(21) Appl. No.: 18/652,632

(22) Filed: May 1, 2024

(65) Prior Publication Data

US 2024/0295757 A1 Sep. 5, 2024

Related U.S. Application Data

(63) Continuation-in-part of application No. 18/087,655, filed on Dec. 22, 2022, now Pat. No. 12,025,854.

(51) Int. Cl.
G02C 11/04 (2006.01)
G02C 11/00 (2006.01)

(52) U.S. Cl.
CPC ............. G02C 11/04 (2013.01); G02C 11/10 (2013.01)

(58) Field of Classification Search
CPC .......... G02C 3/003; G02C 11/04; G02C 11/10
See application file for complete search history.

(56) References Cited

U.S. PATENT DOCUMENTS

| | | |
|---|---|---|
| 3,634,676 A | 1/1972 | Castellano |
| 4,254,451 A | 3/1981 | Cochran, Jr. |
| 5,946,071 A | 8/1999 | Feldman |
| 6,857,739 B1 | 2/2005 | Watson |
| 7,377,664 B2 | 5/2008 | Waters |
| 8,899,744 B2 | 12/2014 | Waters |
| 9,322,535 B1 | 4/2016 | Al Rasheed et al. |
| 10,139,652 B2 | 11/2018 | Windham |
| 10,391,310 B2 | 8/2019 | Liu et al. |
| 10,391,312 B2 | 8/2019 | Mowery |
| 11,287,675 B1 | 3/2022 | Calrson |
| 2007/0200998 A1 | 8/2007 | Schrimmer et al. |
| 2009/0213324 A1 | 8/2009 | Jordan |

(Continued)

FOREIGN PATENT DOCUMENTS

| | | |
|---|---|---|
| CN | 104678580 A | 6/2015 |
| CN | 107202313 A | 9/2017 |

(Continued)

OTHER PUBLICATIONS

International Search Report and Written Opinion dated Jun. 3, 2025 in PCT/US2025/025449 (13 pages).

*Primary Examiner* — Keith G. Delahoussaye (74) *Attorney, Agent, or Firm* — YOUNG LAW FIRM, P.C.

(57) ABSTRACT

Circumambient illumination eyewear includes one or more lenses, a frame configured to support the lens(es) on a user's face at least partially around the user's eyes, at least one illumination strip mounted to the frame and/or the at least one lens and configured to emit light, and a battery configured to be electrically coupled to the illumination strip(s). The illumination strip(s) extend at least along a top portion of the eyewear and along a bottom portion of the eyewear and are configured to face away from the user's face to create an illuminated and shadow-free workspace facing the circumambient illumination eyewear.

21 Claims, 12 Drawing Sheets

(56) References Cited

U.S. PATENT DOCUMENTS

| | | | |
|---|---|---|---|
| 2011/0037606 A1* | 2/2011 | Boise | G02C 11/10 |
| | | | 340/815.45 |
| 2018/0246348 A1 | 8/2018 | Shiratori | |
| 2019/0277481 A1 | 9/2019 | Koyama et al. | |
| 2020/0124877 A1 | 4/2020 | Hsu | |
| 2021/0311322 A1 | 10/2021 | Belanger et al. | |
| 2021/0338082 A1 | 11/2021 | Steier et al. | |
| 2022/0179215 A1 | 6/2022 | Jeon | |
| 2022/0244575 A1 | 8/2022 | Castaneda | |
| 2022/0268427 A1 | 8/2022 | Wilt et al. | |
| 2022/0334411 A1 | 10/2022 | Pastore, Jr. | |
| 2024/0069363 A1* | 2/2024 | Caspari | A45C 11/04 |

FOREIGN PATENT DOCUMENTS

| | | | |
|---|---|---|---|
| GB | 2070221 | 9/1981 | |
| TW | M634971 U * | 12/2022 | A61B 5/16 |

* cited by examiner

EYEWEAR WITH CIRCUMAMBIENT ILLUMINATION

CROSS-REFERENCE TO RELATED APPLICATIONS

This application is a continuation-in-part of application Ser. No. 18/087,655 filed Dec. 22, 2022, which is incorporated herein by reference in its entirety and for all purposes.

BACKGROUND

Field of the Invention

The embodiments disclosed herein relate generally to eyewear, and more particularly to eyewear that includes lighting disposed entirely or at least partially around both eyes or each eye to provide circumambient illumination for the user while they are wearing the eyewear.

DETAILED DESCRIPTION

Conventional illuminated eyewear (e.g., lighted glasses, goggles and the like) do not provide illumination that adequately illuminates the wearer's workspace. Indeed, such conventional eyewear not only weakly illuminates the eyewear user's workspace (his or hers near field of view) but does so while creating shadows in the illuminated area. These shadows obscure portions of the work area as the feeble light emitted from the eyewear can often be considered to be a point source of light which, depending upon the angle of incidence on objects within the workspace, illuminates some features while failing to illuminate other features. Moreover, the feeble light intensity emitted by such eyewear is often weaker than the existing ambient light in the room where they are used, thereby failing to shine light in the shadows created by the existing light fixtures. Some conventional illuminated eyewear is purely for decorative or for entertainment purposes and fails to provide circumambient, shadow-free illumination of a workspace.

What are needed, therefore, are eyewear devices (e.g., glasses, facemasks, goggles, eyewear frames (with or without lenses), loupes and magnifiers that provide bright, circumambient illumination to a user's workspace in such a manner as to provide shadow-free illumination of the user's workspace. In one embodiment, therefore, circumambient illumination eyewear provides illumination from light sources disposed mostly or completely surround each eye or both of the eyes of the user, for shadow-free illumination of the workspace. In one embodiment, the circumambient illumination eyewear provides illumination from light sources disposed around the lens or lenses of the eyewear. In yet another embodiment, the circumambient illumination eyewear provides illumination from light sources disposed around the periphery of the eyewear and that face away from the user's eyes. In another embodiment, circumambient illumination eyewear provides a luminous flux intensity of at least 50 lumens of illumination onto the workspace, for superior, shadow-free illumination in even the darkest of workspaces. Within the context of the present disclosure, the term "workspace" is intended to cover any area that requires illumination. Therefore, workspaces can include a desk, workbench, a sterile filed in an operating room, complex machinery or wiring or any other area that would benefit from substantially shadow free lighting. Other potential workspaces include a person's close field of view while carrying out activities including, for example, camping, rock climbing, law enforcement, military, health care, and the like. Moreover, embodiments may find utility for emergency crews, EMTs/paramedics, firefighters, repair crews, Information Technology (IT) personnel, home repair/contractors, construction, mechanics, mining operations, dentists and dental hygienists, doctors, surgeons, nurses, those participating in outdoor activities, sports and the like.

Other features and significant aspects of the disclosed embodiments will become apparent from the following more detailed description, taken in conjunction with the accompanying drawings.

Figure 1:
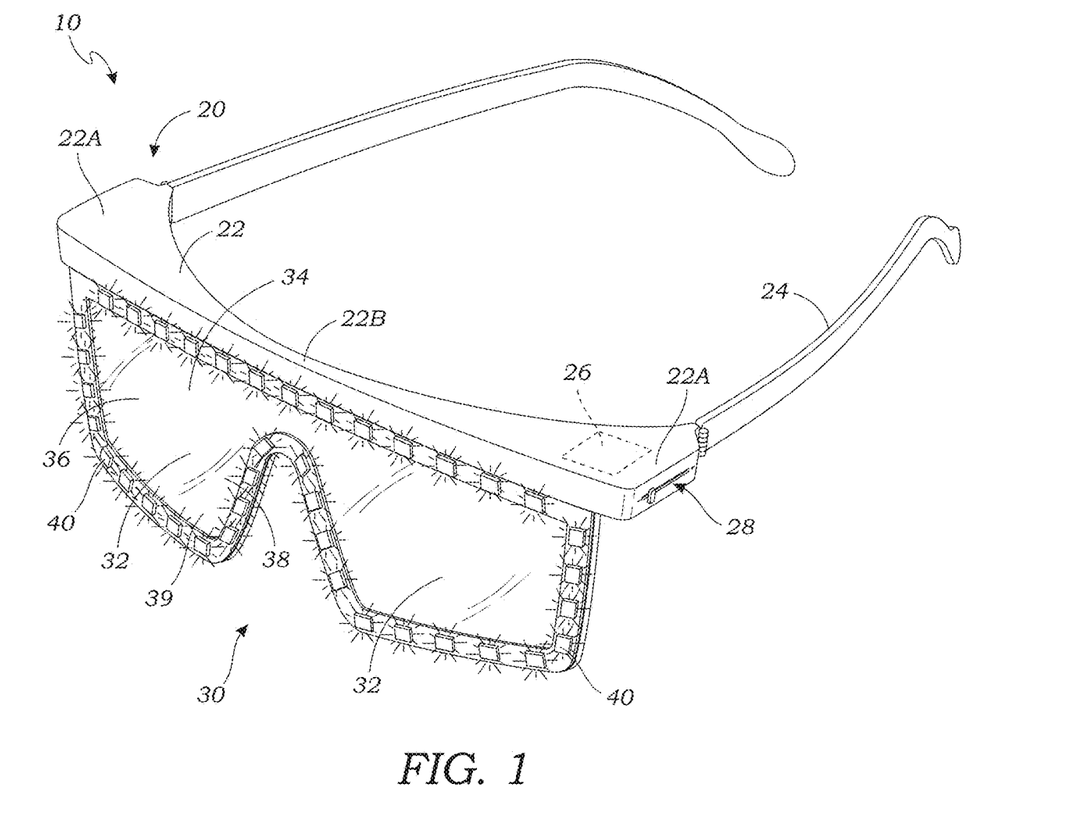
FIG. 1 is a perspective view of a circumambient illumination eyewear according to one embodiment.
Figure 2:
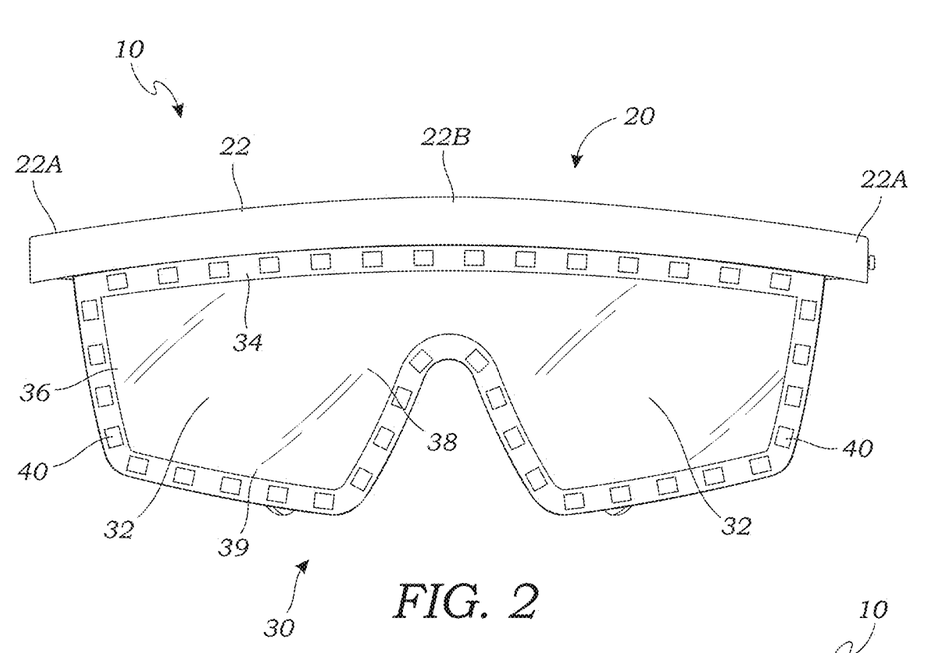
FIG. 2 is a front plan view of the eyewear of FIG. 1.
Figure 3:
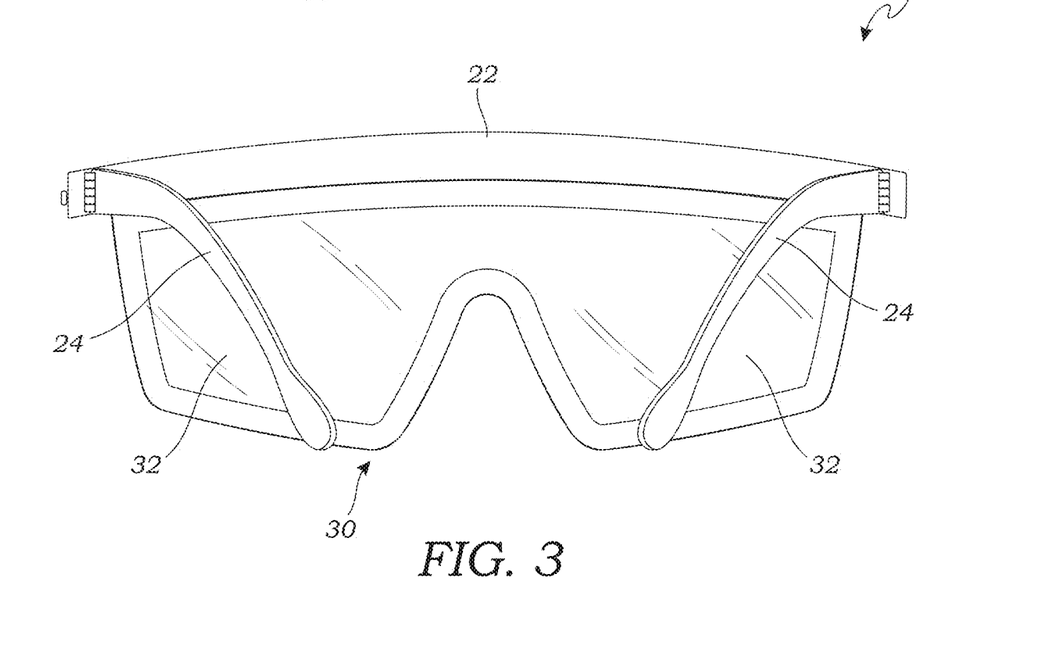
FIG. 3 is a rear plan view of the eyewear of FIG. 1.
Figure 4:
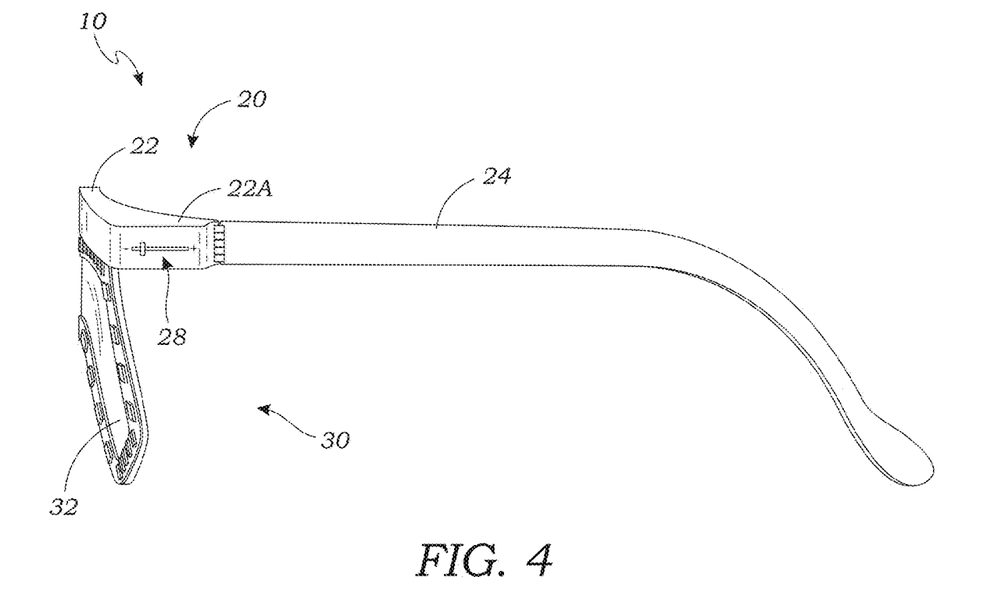
FIG. 4 is a side elevation view of the eyewear of FIG. 1.

FIG. 1 is a perspective view of a circumambient illumination eyewear 10 according to one embodiment. FIG. 2 is a front plan view thereof; FIG. 3 is a rear plan view thereof; and FIG. 4 is a side elevation view thereof. Considering now FIGS. 1-4 collectively, the circumambient illumination eyewear 10 includes a frame 20 sized and shaped to be mounted over the eyes of the user and configured to be removably fitted to the user's head, in the same manner as a pair of glasses or goggles. The frame 20 may include a bridge portion 22 that extends between temple ends 22A, and across a midsection 22B that is positioned, in use, above the user's nose.

The frame 20 further includes mounting structures that enable the eyewear 10 to be mounted over the user's face. In this embodiment, such mounting structures may include a pair of stems 24 that may be pivotally or somewhat elastically or flexibly mounted on, coupled to or integral with the temple ends 22A of the frame 20. However, in alternative embodiments, these mounting structures may be or include a flexible strap 25 (shown in FIG. 6) that wraps around the user's head, or any other structure that enables the eyewear 10 to fit onto the user's face. Structures other than stems or straps may be implemented to good effect.

An eye covering portion 30 of the eyewear 10 may be mounted to the frame 20. In the embodiment of FIG. 1, the frame includes the bridge 22. However, in other embodiments, the frame 20 may not include a bridge portion 22 and the eye covering portion 30 may be mounted directly to the mounting structures (such as the stems 24). The eye covering portion 30 may include a single lens 32 or a pair of lenses 32 mounted onto the frame 20. Herein, the term "lens" is expressly intended to cover embodiments in which the lens is configured to correct vision by refracting incident light or embodiments in which the eye covering portion is but a clear eye shield (e.g., glass, plastic or polycarbonate) that does not provide appreciable eyesight correction, much in the same manner as the lens of safety glasses or goggles. Also, the term "pair of lenses", as used herein, is defined to broadly include any construction that has a region thereof that cover each of the user's eyes, whether formed of a single piece (as illustrated in FIGS. 1-4 and 6-9, 11-12), or of two or more physically separated pieces (as illustrated in FIG. 10). Also, the terms "lens or lenses" include any form of transparent or partially-opaque non-permeable material having two opposed surfaces that covers the user's eyes, whether or not any of these opposed surfaces are curved or not. It is not required that these elements be curved in a manner that directs light rays in any manner. The pair of lenses may have curvatures for directing light, they may be tinted or otherwise coated, and/or have any other treatments-such as to reduce glare, as is known in the eyewear arts.

As shown in FIG. 1, the lens or lenses 32 may comprise an upper edge 34 that may be mounted to the bridge 22 of the frame 20, an outer side edge 36 that extends downwardly from the temple end 22A, an inner side edge 38 that extends downwardly from the midsection 22B, the outer side edges 36 and the inner side edges 38 being connected by a bottom edge 39. Alternatively, the lens or lenses 32 may define an outer edge that at least partially surrounds each or both of the user's eyes, however that outer edge may be shaped.

As shown in FIGS. 1-2, at least one illumination strip 40 may be disposed around the lens or lenses 32 in such a manner that the illumination strip(s) 40 emits light from at least the upper edge 34 and the bottom edge 39 of the frame 20. In other embodiments, anywhere where a single illumination strip is shown in the drawings, there may be two or more rows of illumination strips provided, following a roughly parallel path. In some embodiments, the illumination strip 40 may be in the form of a single elongate illumination element or series of elements disposed around each pair of lenses 32. In other embodiments, the illumination strip(s) 40 may be implemented as separate illumination elements or groups of illumination elements disposed on the upper edge 34 and bottom edge 39, and optionally adjacent the side edges of the lens or lenses.

In this embodiment, the illumination strip(s) extend entirely around the outer periphery of the lens 32 or pair of lenses, that is, along the upper edge 34, the outer side edge 36, the bottom edge 39, and the inner side edge 38, and emits light from each edge 34, 36, 39, and 38. The illumination strip(s) 40 may thus form an annular structure that uniformly surrounds the single lens 32 or the pair of lenses 32. In other embodiments, the constituent light elements of illumination strip or strips 40 may, as shown in FIGS. 1-2, be spaced apart from one another along at least a portion of the periphery of the lens 32 or the pair of lenses 32, so long as, in one embodiment, the majority (at least 50%) of each of the sides of the lens 32 or pair of lenses is covered by or includes light emitting elements. In some embodiments, uniform coverage may be provided along all sides as far as practicable, but it is expected that some variance may be required due to limitations in the structure of the eyewear, including weight considerations. Alternative examples of the illumination strips 32 are shown in FIGS. 6-12 and discussed further below.

Figure 6:
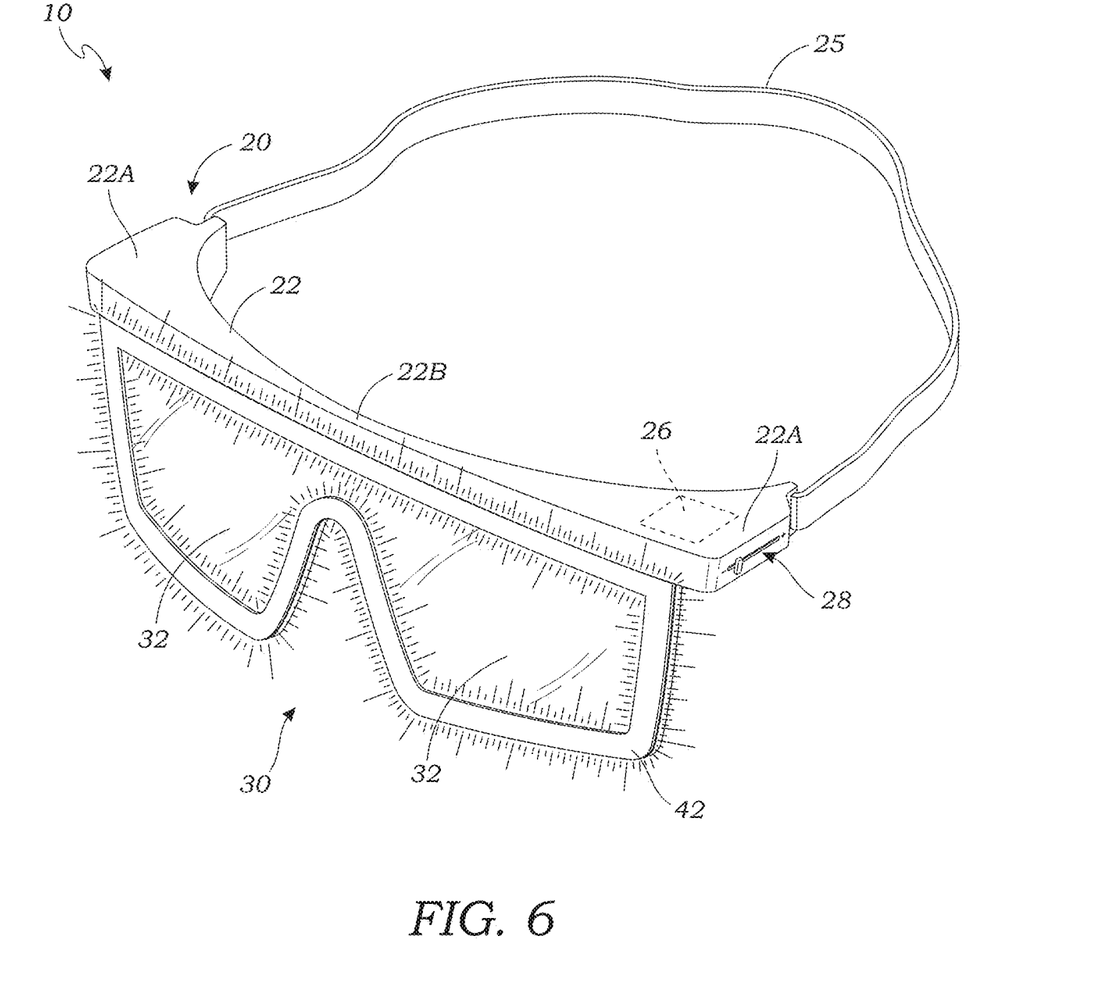
FIG. 6 is a perspective view of a second embodiment of the present circumambient illumination eyewear.

In the embodiment of FIGS. 1-2, the illumination strip(s) 40 may include one or more Light Emitting Diode (LED) strips; however, in other embodiments, such as shown in FIG. 6, other forms of illumination may be used, such as an illumination cord 42 (shown in FIG. 6), and/or any other form of illumination. For example, the illumination strip(s) 40 may rely on chemiluminescence or other forms of electroluminescence to generate light. In another embodiment, fiber optics may be used in which extruded (or similarly formed) fibers may be attached to the frame 20 in any desired layout, e.g., side-by-side, lining the entire frame 20, or on only select portions. Other non-LED light sources may incandescent light sources such as tungsten filament, halogen, sodium vapor, neon, fluorescent, or any other light source known in the art, as deemed suitable for different lighting situations, safety considerations and desired workspace effects. Xenon-based illumination may be provided, which is particularly favored in the medical/surgical fields. Some embodiments may require an external power source electrically coupled to the circumambient illumination eyewear. In other embodiments, the illumination strip(s) 40 may include non-visible lighting such as ultraviolet (including UVA) or infrared. Moreover, the illumination strip or strips 40 may be configured to generate light in only a single frequency or light comprising only a limited number of frequencies (colors). In the case of multiple light sources on a single frame 20, each light source may include a different switch/dimmer to adjust the intensity of the emitted light as desired, or the illumination strips 40 may be connected to the same switch, or to different and independent switches and/or dimmers. The illumination strip or strips 40 may comprise more than one type of light emitting element, according to the envisaged application.

At least one illumination strip 40 may include high intensity lighting elements that emit, collectively, at least 50 lumens onto the workspace. In the present context, the term "workspace" refers to a physical space that the user is looking at through the present eyewear 10. An output of at least 50 lumens is significantly stronger than decorative lighting, which tends to be limited to 1-30 lumens. In one embodiment, the illumination strip(s) 40 may collectively generate an output of at least 100 lumen, and stronger systems, according to other embodiments, may have an output of about 500 lumen or more.

According to embodiments, the illumination strip(s) 40 may be covered by a protective clear covering that may be separate from or integrated into the frame 20, to protect the light emitting elements from debris and contaminants in the user's workspace, to provide a smooth tactile feel and to enhance the aesthetics of the eyewear. According to some embodiments, the illumination strip(s) 40 of the eyewear 10 may include a (e.g., reflective) backing, disposed between the forward facing illumination strip(s) and the user's face, that directs light in a forward direction, away from the user's eyes. Embodiments may also include a diffuser for properly diffusing the light, and/or a lens or lenses over at least some of the light emitting elements for directing the light emitted in a desired direction—e.g., away from the user's eyes and toward the intended workspace. Significantly, since the light emitted by the eyewear 20 is coming from every or at least several direction around the eyes of the user, no shadows of any significance can form in the workspace, which facilitates work being performed in the workspace, increases productivity and workplace safety.

Figure 5:
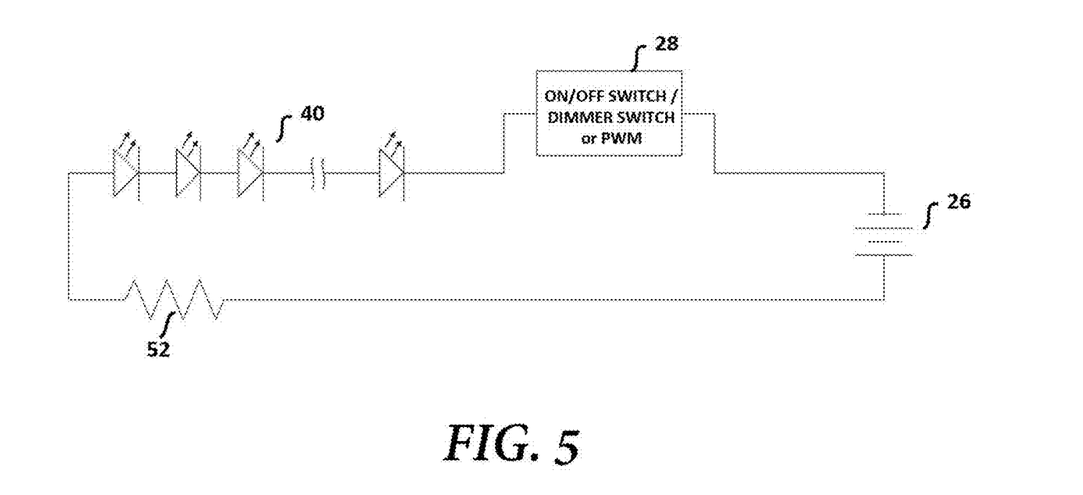
FIG. 5 is a simplified schematic of one possible implementation of the electrical supply and controls used in the circumambient illumination eyewear of FIG. 1.

FIG. 5 is a schematic of one embodiment of electronics used in the circumambient illumination eyewear of FIG. 1. FIG. 5 shows an embodiment in which the light emitting elements comprise a plurality of series-connected LEDs. Other forms of illumination will require other circuit topologies, components and values. As shown in FIGS. 1 and 5, the illumination strip(s) 40 may be connected to a DC battery 26 through a switch 28. The switch 28 may be an ON/OFF switch and may include dimmer switch functionality. A switching potentiometer may be used for this purpose. In the case where a simple ON/OFF switch is used, (no dimming capability), a current limiting resistor 52 may be required in series with the light emitting elements. The circuit of FIG. 5 may also include several branches (each comprising a train of series-connected LEDs and a current limiting resistor) connected in parallel. Other sources of illumination will require other supply/control/biasing/ballast circuits according to requirements. In one embodiment, the battery 26 may be mounted in the frame 20 at one (or both) of the temple ends 22A, for example. However, other locations may also be used. For example, the battery 26 may be mounted on the stem 24 or stems 24, or it may be mounted on a structure that surrounds the user's head, and electrically connected to the illumination strip(s) 40. Alternatively still, a small battery pack may be provided that is attachable to the user's waist and electrically connected via a cable to the present circumambient eyewear. The dimmer switch 28 may be provided, to enable the intensity of the illumination to be adjusted. An LED driver circuit may be provided that is configured to provide an adjustable regulated current source to the LEDs. The current regulation (and control of illumination intensity) may be effectuated through an on-chip potentiometer and/or a pulse width modulation (PWM) signal, to account for, for example, temperature fluctuations that can affect the current draw by the LEDs and detrimentally affect the state of charge of the battery or batteries.

Indeed, according to another embodiment, a PWM may be implemented to vary the intensity of the emitted light. Using a PWM module, the LEDs are turned on and off at a sufficiently rapid rate that is imperceptible to the user. By adjusting the ratio of time on vs time off (duty cycle), the apparent brightness of the light emitted by the illumination strip(s) 40 may be adjusted without appreciable generation of heat in a dimmer switch. Advantageously, the lifetime of the battery 26 will be longer using a dimming solution based on PWM than it would otherwise be by converting current from the battery 26 into heat in a resistor-based dimmer switch. Other methods of varying the light intensity may also be implemented. The battery may be a disposable lead acid battery or may be a rechargeable battery incorporating, for example, lithium-ion chemistry. In case a rechargeable battery is used, a charging port may be provided or wireless charging functionality may be provided.

FIG. 6 is a perspective view of a second embodiment of the circumambient illumination eyewear 10. As noted above, FIG. 6 illustrates the illuminated cord 42 that surrounds each or both of the user's eyes, and the frame 20 in this implementation is held in place with a flexible strap 25 rather than rigid stems. As in other embodiments, the frame 20 may be configured as shown in FIG. 6 or may be significantly different therefrom, as long as the frame 20 functions to support the lens or lenses 32 on the user face and optionally supports or at least connects to the ON/OFF and dimmer functionalities discussed herein. In the drawings, a manual ON/OFF switch/dimmer switch is shown at reference numeral 28. In other embodiments, however, voice control of such functions may be preferable, to enable hands-free control of illumination. It is anticipated that Systems On Chip (SOC) incorporating such ON/OFF and voice recognition functionalities may be sufficiently reliable and inexpensive so as to make their integration in the present eyewear 10 both useful and economically viable at scale. For example, using such a system, a surgeon may be able to simply say increase illumination by 20%, all the while keeping her hands on the patient and task at hand.

Figure 7:
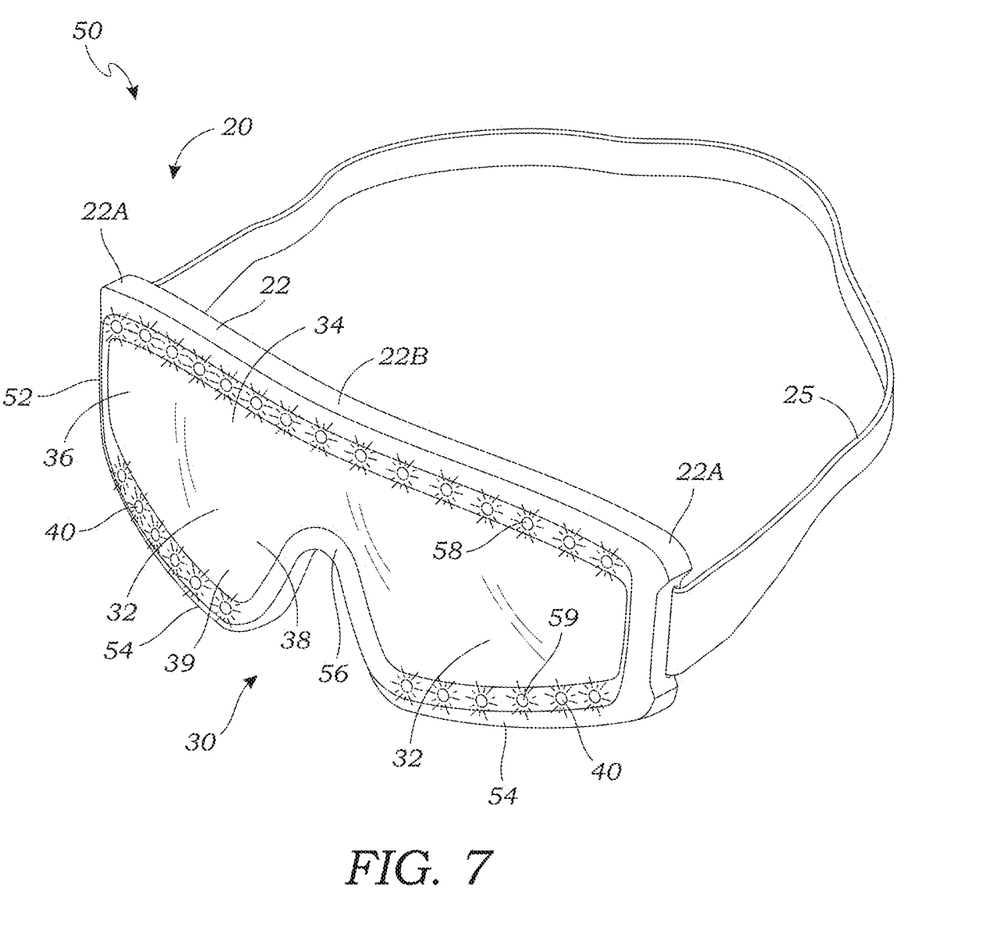
FIG. 7 is a perspective view of a third embodiment of the present circumambient illumination eyewear.

FIG. 7 is a perspective view of a third embodiment of the circumambient illumination eyewear 50. As shown in FIG. 7, the frame 20 may include a side frame portion 52 adjacent to the side edge 36 of the lens 32, and bottom frame portions 54 that are generally disposed underneath each of the eyes of the user while the eyewear 50 is being worn. The bottom frame portions 54, as shown, may be connected by a nose receiving notch 56 that is shaped to rest upon the user's nose. In this embodiment, the lighting strip or strips 40 may include a top line of discrete light sources 58 (as shown) or a continuous light source along most of or substantially all of the bridge 22, and further includes a bottom line of discrete light sources 59 or a continuous light source along most of or substantially all of each of the bottom frames 54. In this embodiment, the nose receiving notch 56 may not include any illumination source or sources, but in other embodiments illumination may be included there as well.

In one embodiment, the illumination strip or strips 40 may be configured to emit light having a frequency that is outside of the visible spectrum (e.g., infrared, just below the visible frequency end of the spectrum, or indigo or ultraviolet just above the higher end of the visible spectrum). However, in other embodiments, such non-visible light source may collectively emit over 50 lumens, and even over 100 lumens. In some embodiments, such strips may operate at lower power that is below 50 lumens, without the eyewear, however, being used for decorative or entertainment purposes.

Figure 8:
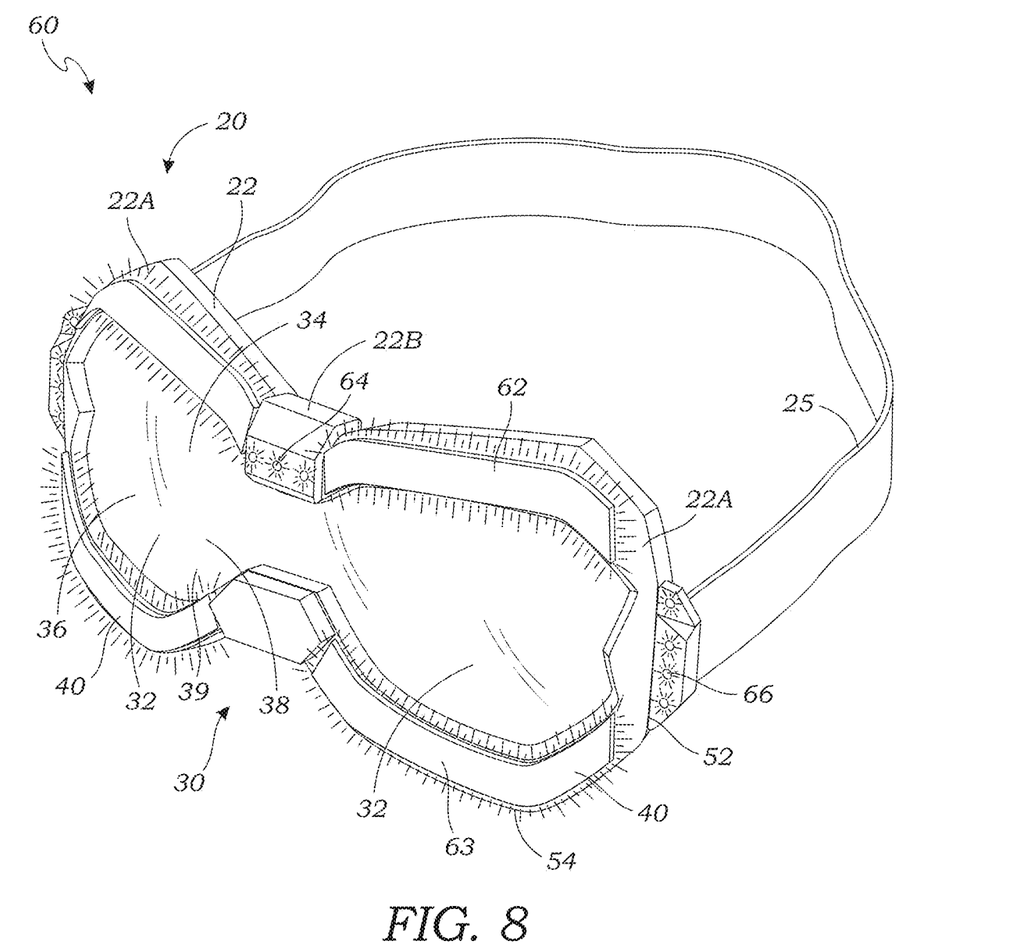
FIG. 8 is a perspective view of a fourth embodiment of the present circumambient illumination eyewear.

FIG. 8 is a perspective view of a fourth embodiment 60 of the present circumambient illumination eyewear 60. As shown in FIG. 8, the illumination strips in this embodiment are configured as two discrete upper strips 62 spaced away from one another and two discrete lower strips 63 that are also spaced apart from one another. Both upper strips 62 and both lower strips 63 are disposed around the lens or lenses such that they are disposed one along the upper edge 34, one along the outer side edge 36, another along the bottom edge 39, and a last one along the inner side edge 38. These strips 62, 63 may be configured to emit light from each edge 34, 36, 39, and 38 of the eyewear 60. As illustrated, in this embodiment, the upper strips 62 are mounted on the bridge 22, and the lower strips 62 are on the bottom frames 54. However, the upper and/or lower strips may be directly mounted to the lens(es) or some may be mounted to the frame while others may be mounted directly to the lens or lenses 32. Providing the illumination strips only on the upper and lower edges of the eyewear may also provide the desired shadowless workspace, depending upon the application and lighting requirements.

In one embodiment, also shown in FIG. 8, the light strips may further include one or more center light elements (e.g., LEDs) 64 mounted on the center portion 22B of the frame 22. In yet another embodiment, the light strips may further includes one or more side light elements (e.g., LEDs) 66 mounted on the sides of the frame 52, stereo right and left. In yet another embodiment, these side light emitting elements may be provided on short stalks extending from the sides of the frame, to provide even greater illumination than would otherwise be possible had they been located close to the user's head. According to embodiments, all of these light sources emit a collective 50 or more lumens; however, in alternative embodiments the collective luminous flux emitted thereby may be less than 50 lumens.

Figure 9:
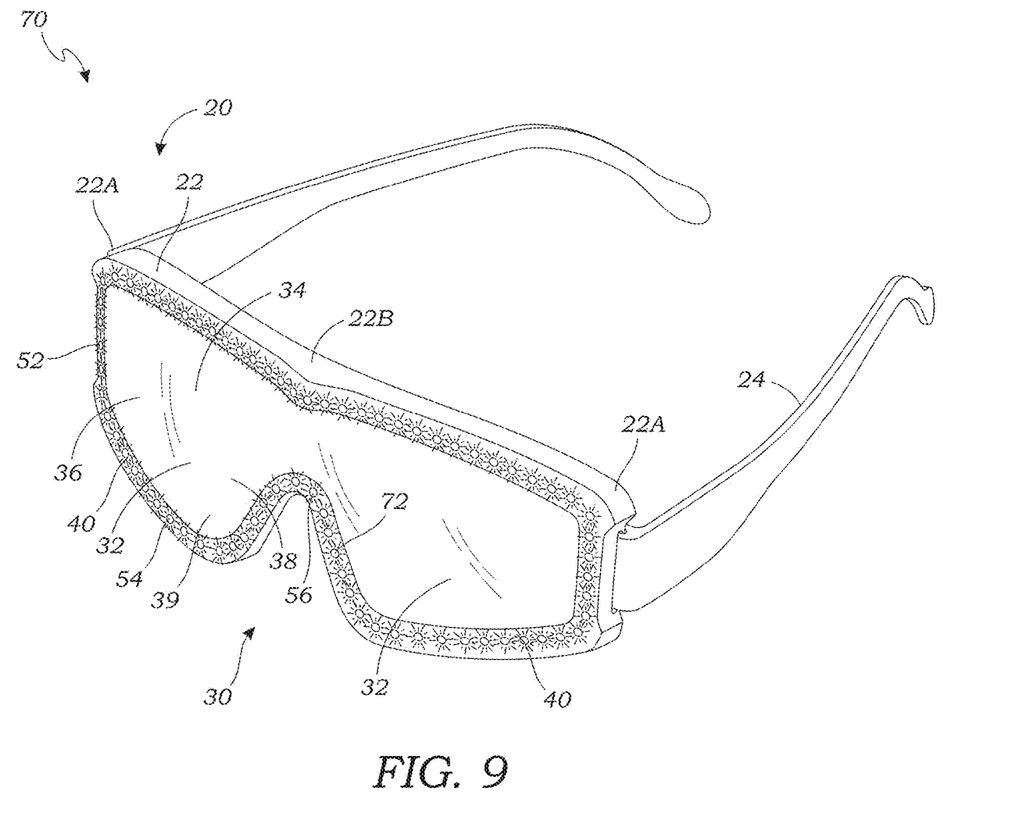
FIG. 9 is a perspective view of a fifth embodiment of the present circumambient illumination eyewear.
Figure 10:
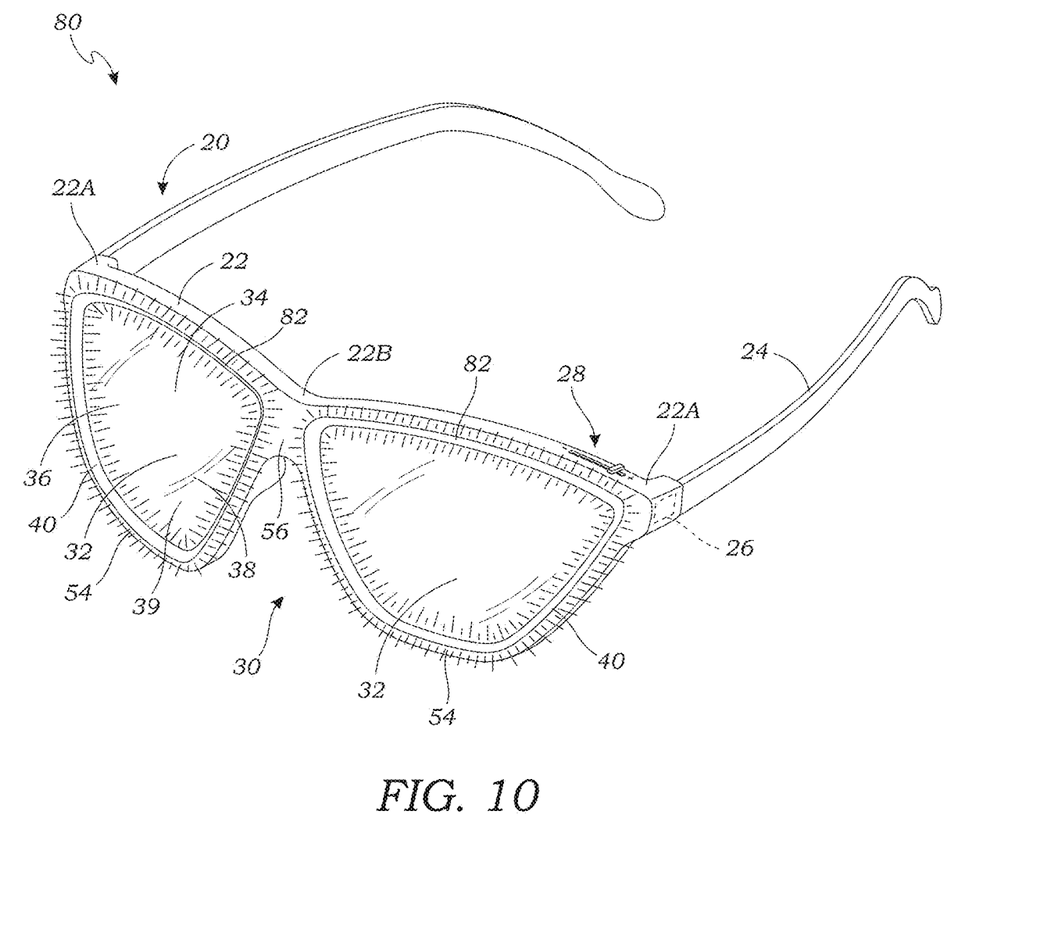
FIG. 10 is a perspective view of a sixth embodiment of the present circumambient illumination eyewear.

FIG. 9 is a perspective view of a fifth embodiment of the circumambient illumination eyewear 70, and FIG. 10 is a perspective view of a sixth embodiment of the circumambient illumination eyewear 80. Similar to the previous figures, FIG. 9 illustrates lights 72 (in one embodiment, LEDs) that extend entirely along the periphery frame 20 opposite the user's face, covering all of the bridge 22, the sides 52, the bottom 54, and the nose bridge 56. FIG. 10 illustrates an embodiment in which lighting cords 82 (any source of illumination in which the light appears to be continuous, rather than a train of discrete light sources) are disposed between the outer edge of the lens 32 and the outer edge of the frame 20. In one embodiment, the lighting cord or cords 82 are integrated into the frame 20 such that it appears that (some or all of) the front-facing portion of the frame 20 is luminous. As with FIG. 9, the lighting cords 82 may extend entirely or substantially entirely (e.g., a majority) around the frame 20, in this case forming two annular structures that each entirely surround one of the eyes of the user when the glasses are worn.

Figure 11A:
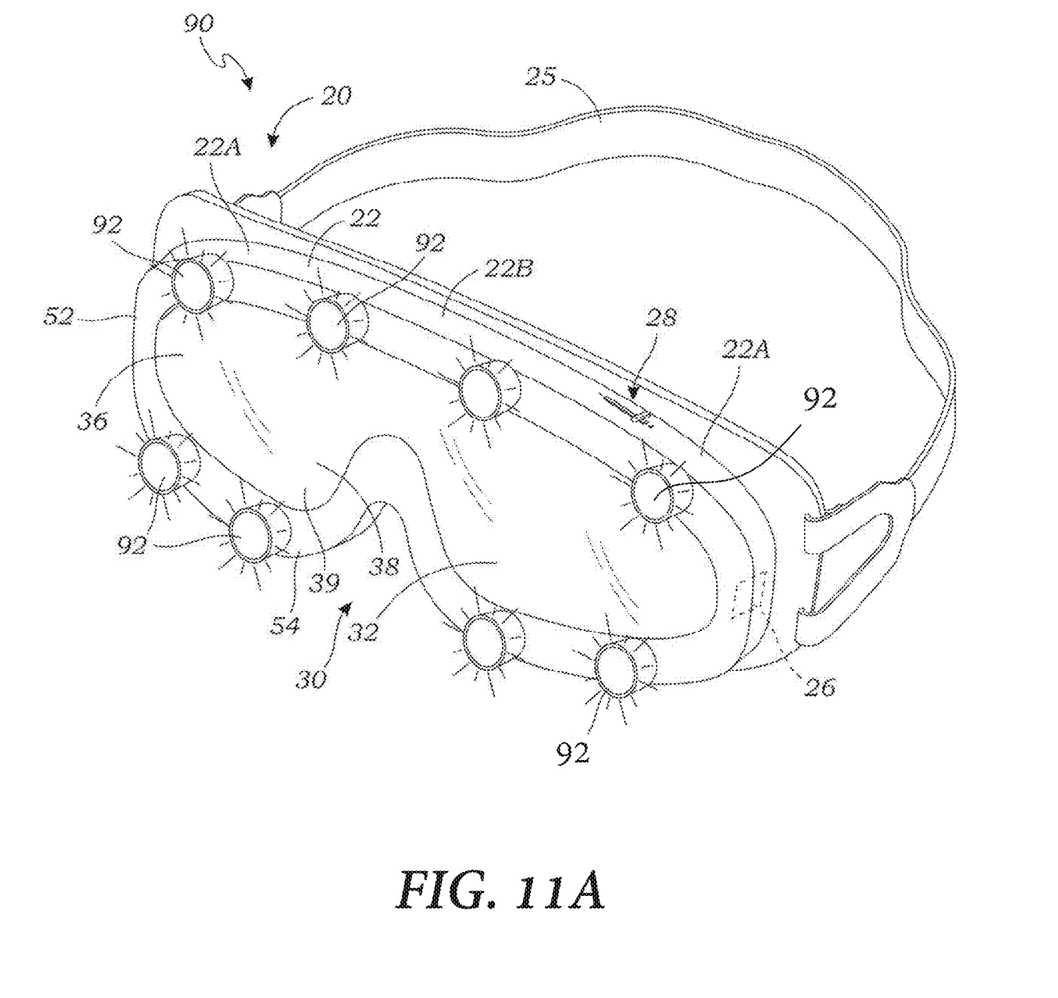
FIG. 11 is a perspective view of a seventh embodiment of the present circumambient illumination eyewear.

FIG. 11A is a perspective view of yet another embodiment of the circumambient illumination eyewear at reference numeral 90. In the embodiment of FIG. 11A, illumination is provided by a plurality of discrete lighting elements or lamps 92, disposed around the periphery of the lens or lenses and/or frame. As noted above, the plurality of lamps 92 may include one or more of LEDs, incandescent lights, or any other sources of illumination). In FIG. 11, the lamps 92 are shown disposed on the bridge 22 over the upper edge 34, and on the bottom frame 54 adjacent the bottom edge 39 of the lens. In this embodiment, there are four lamps 92 along the bridge 22, and two lamps 92 on each bottom frame 54. Other configurations are possible. Each of the lamps 92 may be integrated with a button battery, so that each incorporates its own power source. In other embodiments, a single battery may be provided, electrically coupled to each of the lamps 92.

Figure 11B:
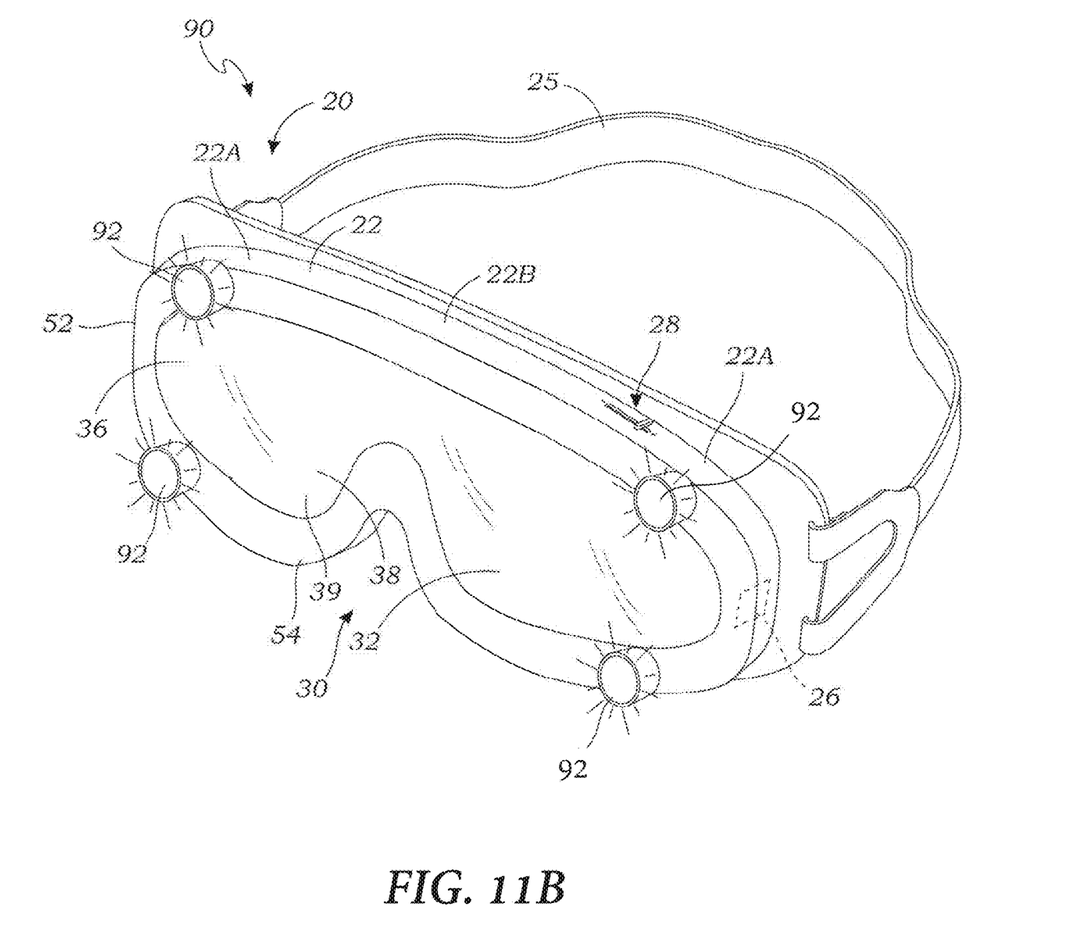

FIG. 11B is a perspective view of another embodiment of the circumambient illumination eyewear 90. In this embodiment, four discrete lamps 92 are mounted to the frame, on at each corner of the circumambient eyewear. By virtue of their vertical separation and their horizontal separation on either side of the user's head, these four lamps 92 are configured to project light onto the workspace in a shadow-free manner.

Figure 12:
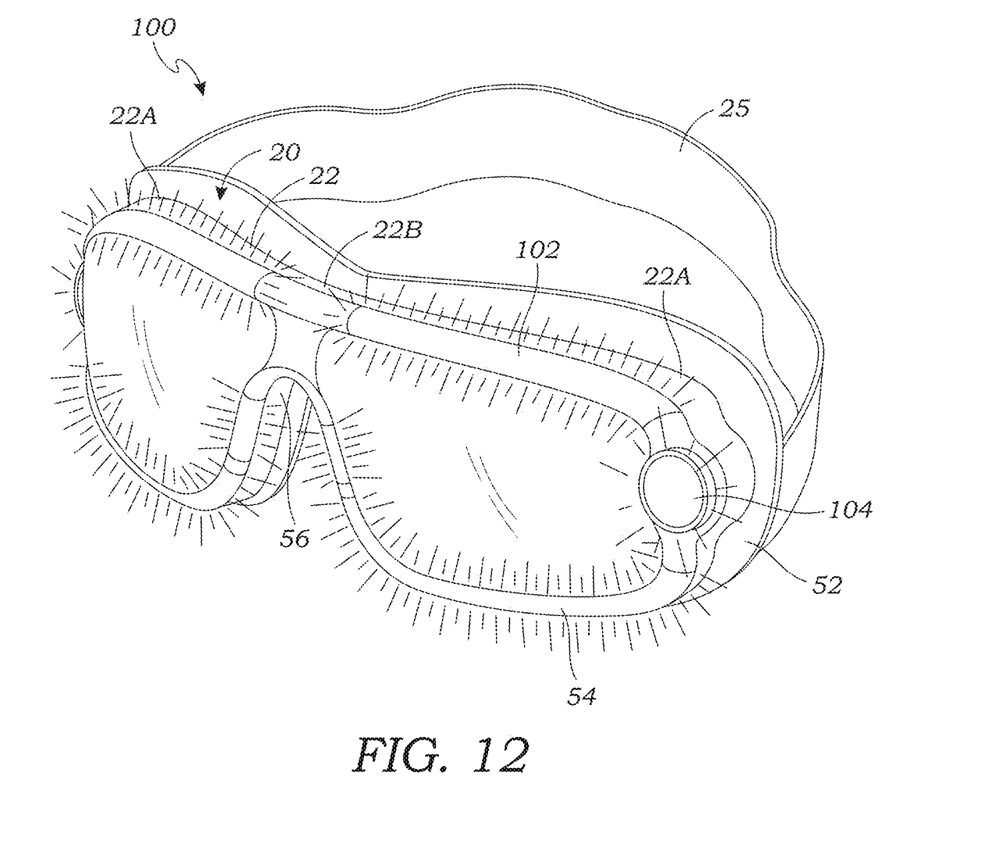
FIG. 12 is a perspective view of an eighth embodiment of the present circumambient illumination eyewear.

FIG. 12 is a perspective view of yet another embodiment of the circumambient illumination eyewear 100. As shown in FIG. 12, a combination of different types of lights, and light sizes may be implemented on a single pair of eyewear 100, in this implementation resembling a pair of goggles. As shown in FIG. 12, illumination strips 102 may be disposed on the bridge 22 above the upper edge 34 of the lens 32, and on the bottom frame 54 below the bottom edge 39 of the lens 32. In this embodiment, a discrete lamp 104 may also be mounted on each of the side frames 52, disposed adjacent the outer side edge 36.

Figure 13:
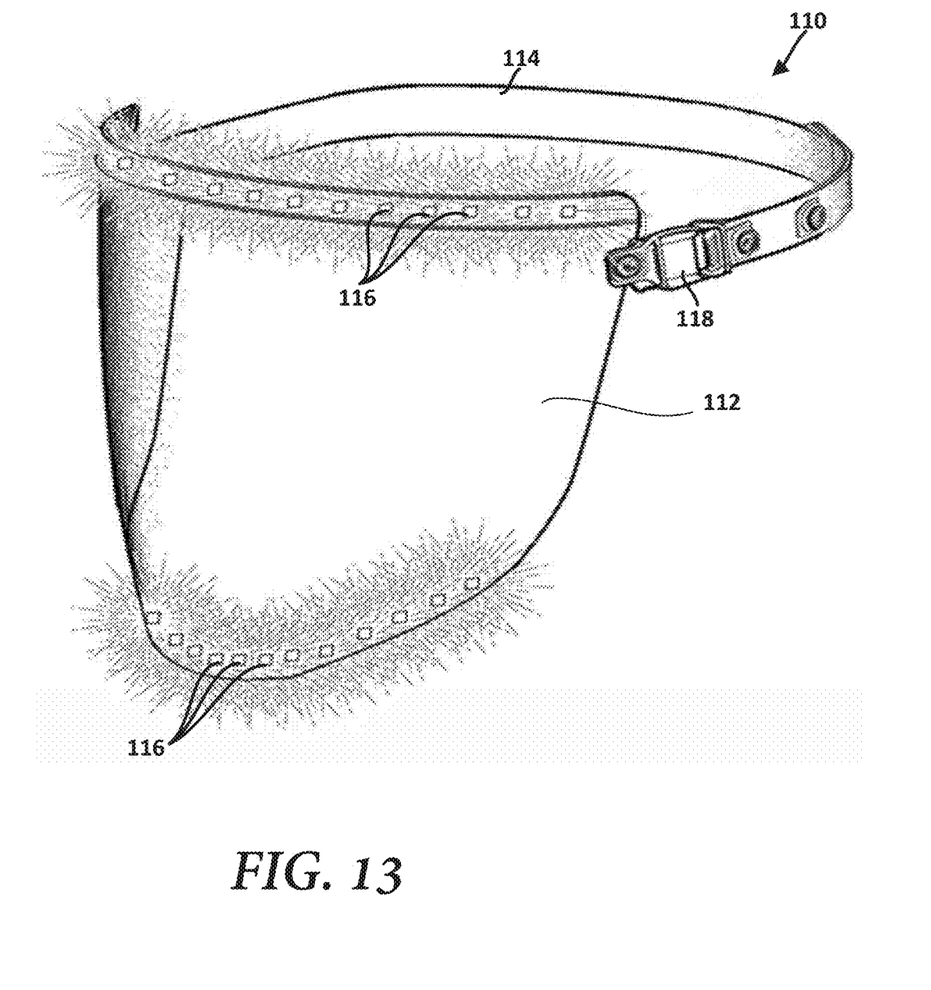
FIG. 13 shows a circumambient illumination facemask according to another embodiment.

FIG. 13 shows a circumambient illumination facemask according to another embodiment. As shown therein, the facemask 110 may include a single transparent non permeable shield 112 configured to cover a user's face; a rigid or flexible frame 114 attached to the shield and configured to enable the shield to be fitted over the user's face; a source of light 116 configured to emit a luminous flux of at least 50 lumen, the source of light 116 being mounted to at least one of the shield 112 and the frame 114 and being disposed around a periphery of the shield; and a battery 118 configured to be electrically coupled to the source of light 116*t*.

The source of light 166 may be configured to face away from the user's face and to create an illuminated and shadow-free workspace facing the face mask when the face mask fitted over the user's face. The source of light 116 may include discrete light emitting elements as shown in FIG. 13 or may be or include a continuous source of light. The source of light 116 may be disposed all or most of the way around the periphery of the shield 112 or, as shown in FIG. 13, may be disposed along a top portion thereof and along a bottom portion thereof. Other implementations are possible.

While some embodiments of the eyewear are illustrated herein, other embodiments will occur to those skilled in the art, including adapting the disclosed embodiments to other shapes of lenses and frames.

For example, any of the embodiments shown in FIGS. 1-11 may be configured to include a pop-out and replaceable lens or lenses. Such may be advantageous when the lens becomes scratched or when another type of lens is required, such as corrective lenses, filtered lenses, and the like. Moreover, embodiments may be configured to fit over and fit snuggly to the user's existing glasses, thereby avoiding the necessity of matching the lens or lenses to the user's prescription. The present eyewear may also include side light blocking shields, to prevent side glare from sources of light external to the present eyewear.

Embodiments of the present circumambient illumination eyewear, therefore, may comprise at least one lens; a frame configured to support the at least one lens on a face of a user; at least one illumination strip mounted to the frame and/or to the at least one lens and configured to emit light, and a battery configured to be electrically coupled to the at least one illumination strip. The illumination strip(s), in one embodiment, may extend at least along a top portion of the eyewear and along a bottom portion of the eyewear. The illumination strip(s) may be configured to face away from the user's face and to create an illuminated and shadow-free workspace facing the circumambient illumination eyewear.

In further embodiments, the at least one lens may include a first lens supported by the frame and a second lens supported by the frame and the illumination strip(s) may surrounds the first and the second lenses. The at least one lens may include a single lens. The illumination strip(s) may include a plurality of discrete light elements or may include a continuous source of light. In one embodiment, the illumination strip(s) may be configured to emit a luminous flux of at least 50 lumens.

The circumambient illumination eyewear may further include a switch configured to selectively couple and decouple the battery from the illumination strip(s) and may further include a dimmer configured to enable an intensity of the light emitted from the illumination strip(s) to be changed.

In a still further embodiment, the illumination strip(s) may be configured to emit light having a frequency that is outside of the visible spectrum.

Another embodiment is circumambient illumination eyewear that may include at least one lens; a frame configured to support the at least one lens on a face of a user; a plurality of lamps that are mounted to at least one of the frame and the at least one lens and configured to emit light, the plurality of lamps facing away from the face of the user when the circumambient eyewear may be worn by the user, and at least one battery configured to be power the plurality of lamps. The circumambient eyewear may define a top portion and a bottom portion and the plurality of lamps may include at least one lamp on either side of the top portion and one lamp on either side of the bottom portion. The plurality of lamps may be configured to collectively emit a luminous flux of at least 50 lumens to create an illuminated and shadow-free workspace.

In further embodiments, the at least one lens may include a first lens supported by the frame and a second lens supported by the frame and the illumination strip(s) may surround (at least partly or a majority of) the first and the second lenses. The at least one lens may include a single lens. A switch may be provided that is configured to selectively and electrically couple and decouple the battery from the plurality of lamps, as may be a dimmer configured to enable an intensity of the light emitted from the plurality of lamps to be changed. In one embodiment, one or more of the plurality of lamps may be configured to emit light having a frequency that is outside of the visible spectrum.

A battery may be provide that is configured to electrically couple to the plurality of lamps.

Yet another embodiment is a face mark that may include a single transparent non permeable shield configured to cover a user's face; a rigid or flexible frame attached to the shield and configured to enable the shield to be fitted over the user's face; a source of light configured to emit a luminous flux of at least 50 lumen, the source of light being mounted to at least one of the shield and the frame and being disposed around a periphery of the shield; and a battery configured to be electrically coupled to the source of light. The source of light may be configured to face away from the user's face and to create an illuminated and shadow-free workspace facing the face mask when the face mask fitted over the user's face.

The source of light may include at least one illumination strip that may be configured to emit light over a length thereof and/or may include a plurality of discrete light elements mounted to the rigid or flexible frame and/or to the shield and configured to emit light. A switch may be provided that is configured to selectively couple and decouple the battery from the source of light. A dimmer switch may also be provided that is configured to enable the intensity of the light emitted from the source of light to be changed. The source of light, in one embodiment, may be configured to emit light having a frequency that may be outside of the visible spectrum.

Significantly, embodiments provide light emitted from what amounts to an area source of illumination, which overcomes the disadvantages inherent in single point light sources that necessarily create shadows in the work area. By providing an area source of light aimed directly at the user's workspace, detail-obscuring shadows are eliminated, thereby enabling a clearer and better lit field of view than would be otherwise possible. Indeed, by providing light from multiple, spaced apart sources disposed across the width and potentially sides of the eyewear, the light impinging upon the workspace originates from sources disposed at multiple angles relative to the target, thereby reducing or eliminating the shadows that would otherwise be formed had the light originated from a single point source. Moreover, that shadowless workspace moves along with the user's head and gaze, such that whatever the user is looking at is uniformly illuminated from multiple angles, eliminating or substantially decreasing detail-hiding shadows.

Embodiments may find utility wherever a brightly lit, shadow-free workspace is desired. For example, a field surgeon may benefit from a shadow-free surgical workspace, as may mechanics peering into dark and shadow-prone crevices in complex mechanical devices. Many other applications will occur to those of skill in this art.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the inventions have been described with reference to at least one particular embodiment, it is understood that the inventions are not limited to these embodiments, but rather the scope of the inventions is defined by the following claims.

What is claimed is:

1. Circumambient illumination eyewear, comprising:
at least one lens;
a frame configured to support the at least one lens on a face of a user, the frame comprising a top portion, a bottom portion, and side portions surrounding the at least one lens;
at least one illumination strip mounted to at least one of the frame and the at least one lens and configured to emit light; and
a battery configured to be electrically coupled to the at least one illumination strip,
wherein the at least one illumination strip extends along the top portion, the bottom portion, and the side portions of the frame, the at least one illumination strip is configured to direct light away from the user's face and to create an illuminated and shadow-free workspace facing the circumambient illumination eyewear.

2. The circumambient illumination eyewear of claim 1, wherein the at least one lens comprises a first lens supported by the frame and a second lens supported by the frame and wherein the at least one illumination strip surrounds the first and the second lenses.

3. The circumambient illumination eyewear of claim 1, wherein the at least one lens consists of a single lens.

4. The circumambient illumination eyewear of claim 1, wherein the at least one illumination strip comprises a plurality of discrete light elements.

5. The circumambient illumination eyewear of claim 1, wherein the at least one illumination strip comprises a continuous source of light.

6. The circumambient illumination eyewear of claim 1, wherein the at least one illumination strip is configured to emit a luminous flux of at least 50 lumens.

7. The circumambient illumination eyewear of claim 1, further comprising a switch configured to selectively couple and decouple the battery from the at least one illumination strip.

8. The circumambient illumination eyewear of claim 1, further comprising a dimmer configured to enable an intensity of the light emitted from the at least one illumination strip to be changed.

9. The circumambient illumination eyewear of claim 1, wherein the at least one illumination strip emits light having a frequency that is outside of the visible spectrum.

10. Circumambient illumination eyewear, comprising:
at least one lens;
a frame configured to support the at least one lens on a face of a user, the frame comprising a top portion, a bottom portion, and side portions surrounding the at least one lens;
a plurality of lamps that are mounted to at least one of the frame and the at least one lens and configured to emit light, the plurality of lamps being configured to direct light away from the face of the user when the circumambient eyewear is worn by the user; and
at least one battery configured to be power the plurality of lamps;
wherein the plurality of lamps include at least one lamp on the top portion, at least one lamp along each of the side portions and one lamp on the bottom portion and wherein the plurality of lamps are configured to collectively emit a luminous flux of at least 50 lumens to create an illuminated and shadow-free workspace facing the circumambient illumination eyewear.

11. The circumambient illumination eyewear of claim 10, wherein the at least one lens comprises a first lens supported by the frame and a second lens supported by the frame and wherein the at least one illumination strip surrounds the first and the second lenses.

12. The circumambient illumination eyewear of claim 10, wherein the at least one lens comprises a single lens.

13. The circumambient illumination eyewear of claim 10, further comprising a switch configured to selectively couple and decouple the battery from the plurality of lamps.

14. The circumambient illumination eyewear of claim 10, further comprising a dimmer configured to enable an intensity of the light emitted from the plurality of lamps to be changed.

15. The circumambient illumination eyewear of claim 10, wherein at least one of the plurality of lamps emit light having a frequency that is outside of the visible spectrum.

16. A face mask, comprising:
a single transparent non permeable shield configured to cover a user's face;
a rigid or flexible frame attached to the shield and configured to enable the shield to be fitted over the user's face;
a source of light configured to emit a luminous flux of at least 50 lumen, the source of light being mounted to at least one of the shield and the frame and being disposed around a periphery of the shield; and
a battery configured to be electrically coupled to the source of light, and
wherein the source of light is configured to face away from the user's face and to create an illuminated and shadow-free workspace facing the face mask when the face mask fitted over the user's face.

17. The face mask of claim 16, wherein the source of light comprises at least one illumination strip that is configured to emit light over a length thereof.

18. The face mask of claim 16, wherein the source of light comprises a plurality of discrete light elements mounted to at least one of the rigid or flexible frame and to the shield and configured to emit light.

19. The face mask of claim 16, further comprising a switch configured to selectively couple and decouple the battery from the source of light.

20. The face mask of claim 16, further comprising a dimmer configured to enable an intensity of the light emitted from the source of light to be changed.

21. The face mask of claim 16, wherein the source of light is configured to emit light having a frequency that is outside of the visible spectrum.

* * * * *